April 26, 1960 P. H. LANDIS 2,933,977
ASTIGMOMETERS
Filed May 7, 1956
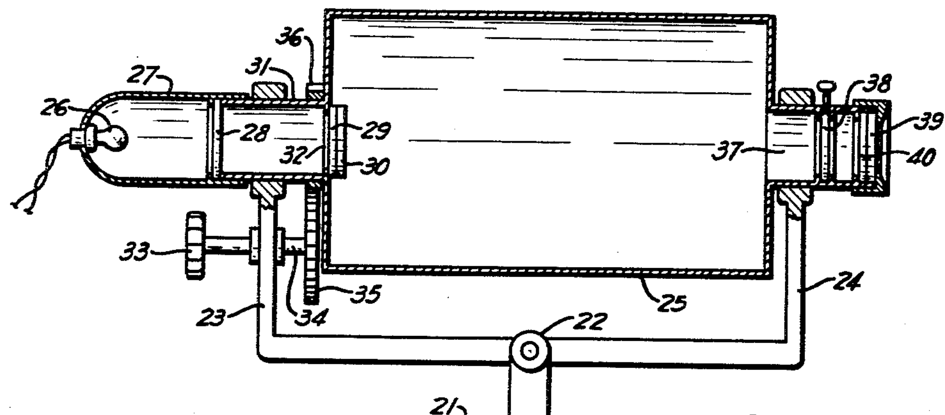
Fig. 1
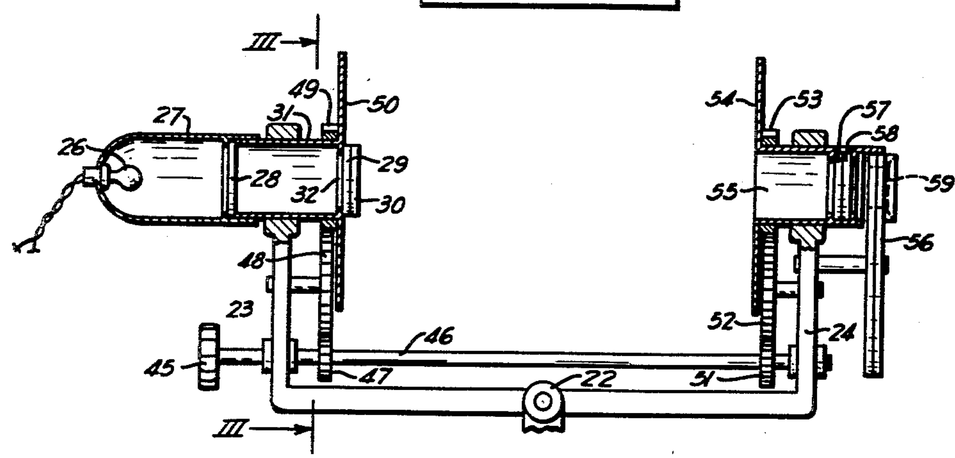
Fig. 2
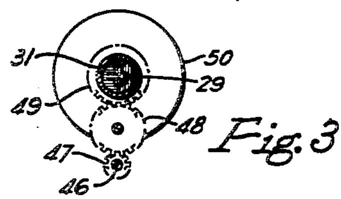
Fig. 3
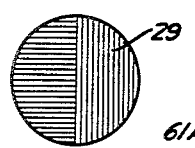
Fig. 4
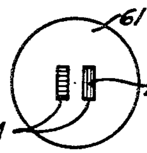
Fig. 5
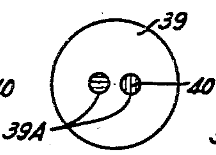
Fig. 6
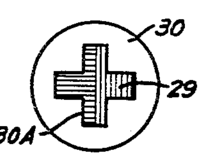
Fig. 7
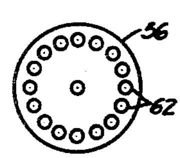
Fig. 8
INVENTOR.
PETER H. LANDIS
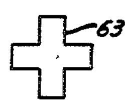
Fig. 9
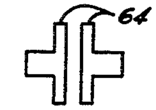
Fig. 10
65
Fig. 11

United States Patent Office 2,933,977 Patented Apr. 26, 1960

2,933,977

ASTIGMOMETERS

Peter H. Landis, Pittsburgh, Pa.

Application May 7, 1956, Serial No. 583,019

9 Claims. (Cl. 88—20)

The present invention relates to visual testing apparatus and more particularly to an improved visual testing apparatus for the determination of the axis and the total amount of astigmia of the human eye.

The general object of the invention is to provide an improved visual testing apparatus for the determination of the axis and the total amount of astigmia of the human eye in which the variable responses of the individual undergoing an eye examination can be made to show a higher degree of accuracy than heretofore effected by present day apparatus.

Another object of the invention is to provide an improved visual testing apparatus for the determination of the axis and the total amount of astigmia of the eye which is highly accurate in testing illiterates, color-blind individuals, young children, as well as in testing an average individual.

Another object of the invention is to provide an improved visual testing apparatus for the determination of the axis and the total amount of astigmia of the eye undergoing an examination while simultaneously maintaining at rest the accommodative reflex of that eye.

A further object of the invention is to provide a means for dividing an easily observable and comprehensible target under observation by the examinee into two visually separate components, separation of said components being variable and under the control of the examiner.

Various types of apparatus have been proposed for the determination of the astigmia of the human eye. All of the apparatus of this type with which I am familiar present certain limitations.

No apparatus heretofore used satisfactorily determines the total amount of astigmia of the eye; some of these devices determine only the astigmia of the cornea of the eye and not the total amount of astigmia of the eye as a whole; other similar devices are inaccurate when used on illiterates, color-blind individuals, or very young children; and still others present too great a percentage of error.

The present invention overcomes these disadvantages by a novel, simple, and inexpensive means. It is based on the well known fact demonstrated by Young and Schneider many years ago that it is possible to obtain monocular diplopia by means of an opaque disc, held close to the eye, which had two minute apertures in close proximity.

I provide a supporting member, a source of illumination, a target in the form of an opaque disc having a central aperture in the form of a cross, two polarizing plates mounted on the target which have their polarizing axes at right angles to each other and which have one edge lying in the vertical medial line of the cross aperture; I provide an enclosure having an open tubular extension at each end and which is rotatably mounted on said supporting member; I provide an eyepiece comprising a stenopaeic disc having two central apertures approximately three-fourths of millimeter in diameter and approximately one millimeter part, and two polarizing plates mounted thereon with their polarizing axes at right angles to each other and corresponding with the axes of the target plates, said plates mounted on said stenopaeic disc in such a manner so as to have one edge of each lying in the area between the two apertures; means are provided for rotating the target and eyepiece simultaneously; I provide a battery of lenses or a replaceable lens and lens holder.

Ordinarily the accommodative reflex of the eyes becomes operative due to blur circles on the retinae, the convergence reflex, or the sense of nearness of the object in view. In my apparatus, the convergence stimulus is suppressed because the apparatus is used monocularly; the sense of nearness is avoided because the white cross of the target is seen against a black non-reflective background without any external objects coming into view; blur circles on the retina are at a minimum because the minute apertures reduce the size of the blur circles and because of the fact that the examinee is made artificially myopic by means of the convex lenses placed before his eye.

In the foregoing general description, I have set out certain advantages, purposes, and objects of my invention. Other advantages, purposes, and objects will be apparent from a consideration of the following description and accompanying drawings in which:

Figure 1 is a vertical section through a preferred embodiment of my invention.

Figure 2 is a fragmentary vertical section through a second embodiment of my invention.

Figure 3 is a vertical section of the embodiment illustrated in Figure 2 taken on line III of Figure 2.

Figure 4 is a schematic representation of the axes of the composite polarizing plates mounted on the target and the eyepiece.

Figure 5 and Figure 6 are plan views of two stenopaeic discs having different aperture forms showing schematically the axes of the polarizing plates mounted thereon.

Figure 7 is a plan view of the target showing schematically the axes of the polarizing plates mounted thereon.

Figure 8 is a sectional view of a battery of lenses as illustrated in Figure 2.

Figures 9 to 11 are plan views of the target as seen by the examinee.

Referring to the drawings in Figure 1, I provide a supporting member 21 having vertical extensions 23 and 24 pivotally mounted at 22, an enclosure 25 having tubular end members 31 and 37 is rotatably mounted on said extensions, a source of illumination 26 enclosed in a housing 27 and having a milk-glass diffusion pane 28 is mounted on end member 31, at the aperture 32 of enclosure 25 is mounted composite polarizing plate 29 and a target 30 having an aperture in the form of a cross 30A, said composite polarizing plate consists of two polarizing plates having their polarizing axis at right angles to each other, and one edge of each lies in the vertical medial line of the cross aperture 30A; in the tubular end member 37 of enclosure 25 is mounted a removable lens 38 and an eyepiece comprising a stenopaeic disc 39 having apertures 39A, and composite polarizing plate 40, said plate consisting of two polarizing plates which have their polarizing axis at right angles to each other and corresponding with the axes of the polarizing plate 29 of target 30, and which have one edge of each lying in the vertical medial line of the stenopaeic disc between the apertures 39A; gear 36 mounted on tubular end member 31 is in mesh with gear 35 which is mounted on shaft 34 and is operated by axis handle 33.

A beam of light from light source 26 in passing through composite polarizing plate 29 and cross aperture 30A is divided into two component beams, one of said components, representing the left half of the cross aperture, has light rays vibrating on a horizontal axis; said light rays will then pass through lens 38 and left aperture 39A of stenopaeic disc 39 because said aperture has a polarizing plate with a horizontal axis, said rays can not pass through the other aperture which has a polarizing plate with a vertical axis; the second component beam, representing the right half of the cross aperture, has light rays vibrating on a vertical axis; the light rays of the second component beam will pass through lens 38 and the right aperture 39A of the stenopaeic disc 39 because said aperture has a polarizing plate whose axis is also vertical, but said rays of the second component beam can not pass through the left aperture 39A which has a polarizing plate with a horizontal axis. It is now apparent that light rays from the left half of the cross aperture will pass through the left aperture of the stenopaeic disc of the eyepiece and the light rays from the right half of the cross aperture can only pass through the right aperture of said stenopaeic disc.

In placing the apparatus in operation, the examinee is seated in front of the apparatus with one eye occluded and with the other eye adjacent to the eyepiece observes the target 30 simultaneously through both apertures 39A of the stenopaeic disc 39; axis handle 33 is set at the zero or 180 meridian thereby placing the apertures 39A in the horizontal position; examinee is asked by the examiner whether he sees the target as a white cross 63 of Figure 9, as 64 of Figure 10, or as 65 of Figure 11; when he sees the target as in Figure 9, Figure 10, or Figure 11, he is emmetropic or normal, myopic or nearsighted, or hyperopic or farsighted respectively in the particular meridian for which the axis handle is set.

If the examinee sees only a part of 63, 64, or 65, it indicates that the examinee is not looking simultaneously through both apertures 39A of stenopaeic disc 39; he is advised to move his eye slightly to the right or left until the target appears as in Figure 9, Figure 10, or Figure 11; when the target is seen as in Figure 9 or Figure 10, both the target and stenopaeic disc 39 are rotated simultaneously by means of the axis handle 33 to a position 90 degrees away from the original position; if during this rotation the target changes from that seen in Figure 9 or Figure 10 to that of Figure 11, a lens 38 of sufficient convex power is placed before the examinee's eye until every meridian presents a target as shown in Figure 10. During said rotation of target 30 and stenopaeic disc 39 from the horizontal to a vertical position, the meridian which presents the least separation of the two components of the target 64 of Figure 10 is the axis of the astigmia of that eye and also represents one of the principal meridians of that eye; at this position, the convex lens power before the eye is reduced or the concave lens power in a myopic eye is increased until the target is seen as 63 of Figure 9; the remaining lens power before the eye is noted or read, then the target and stenopaeic disc are rotated to a position 90 degrees away from the above first reading and the above procedure is repeated until the target is again seen as 63 of Figure 9; the lens power required for this new position is noted; this new position is the other principal meridian; the difference in the amount of lens power between these two readings represents the total amount of astigmia of that eye; the meridian having the highest convex or the lowest concave lens power is taken as the axis of the astigmia of that eye and the difference in lens power between the two meridians represents the total amount of astigmia expressed in minus or concave cylindrical lens.

In the embodiment shown in Figure 2, I have illustrated the tangent screen 50 having mounted thereon a composite polarizing plate 29 and the opaque target 30 having cross aperture 30A; attached to said tangent screen are tubular member 31 having an aperture 32 and gear 49, said gear is in mesh with intermediate gear 48 which in turn is in mesh with gear 47; a source of illumination 26 enclosed in a housing 27 and having a milk-glass diffusion pane 28 is mounted on said tubular member 31; said tubular member is rotatably mounted on the supporting member 23; tangent screen 54 having attached thereon tubular member 55 and gear 53 is rotatably mounted on the supporting member 24; said gear is in mesh with the intermediate gear 52 which in turn is in mesh with gear 51; gears 47 and 51 are mounted on shaft 46 which is supported by supporting members 23 and 24; axis handle 45 which controls the rotation of gears 47 and 51 is mounted on shaft 46; disposed in tubular member 55 is an eyepiece comprising a composite polarizing plate 57 and a stenopaeic disc 58 which may be of the type 39 with apertures 39A or of the type 61 with apertures 61A; a rotatable lens battery 56 is mounted on supporting member 24 and is provided with an aperture 59. Rotation of gears 47 and 51 by means of axis handle 45 will actuate the intermediate gears 48 and 52 which in turn will actuate simultaneously the gears 49 and 53 thereby causing the simultaneous rotation of the target 30 and the eyepiece comprising a composite polarizing plate 57 and stenopaeic disc 58. In Figure 2 lens battery 56 having lenses 62 of varying power may be replaced by removable lenses 38 as shown in Figure 1.

The embodiment illustrated in Figure 2 operates in essentially the same fashion as that shown in Figure 1.

While the invention is susceptible to various modifications and alternative constructions to those I have shown in the drawings and herein described in detail the preferred embodiment, it is to be understood that my invention is not to be limited to the specific form or arrangement of parts herein shown and described.

I claim:

1. A visual testing apparatus for determining astigmatism and the like comprising an enclosure having open passages at each end, a partly enclosed source of illumination adjacent one of said open passages, a single fixation target mounted in front of said one open passage between said passage and the source of illumination, means for polarizing the light rays emitted by the source of illumination and transmitted by said fixation target to provide two different planes of polarized light, whereby said target is differentially polarized, an eyepiece mounted at the other of said open passages of said enclosure to be viewed by an eye being tested said eyepiece being coaxial with the fixation target and the source of illumination and having aperture means spaced apart less than the diameter of the pupil of an eye so as to be simultaneously viewed by a single eye and an analyzing polarizer in each of said aperture means analyzing the polarized light rays transmitted from said target.

2. A visual testing apparatus as claimed in claim 1 wherein means are provided for rotating the fixation target and the eyepiece.

3. A visual testing apparatus for determining astigmatism and the like comprising an enclosure having open passages at each end, a partly enclosed source of illumination adjacent one of said open passages, a single fixation target mounted in front of said opening passage between said passage and the source of illumination, means for polarizing the light rays emitted by the source of illumination and transmitted by said fixation target to provide two different planes of polarized light whereby said target is differentially polarized, an eyepiece mounted at the other of the said open passages of said enclosure to be viewed by a single eye being tested, said eyepiece being coaxial with the fixation target and the source of illumination and having aperture means spaced apart less than the diameter of the pupil of an eye so as to be simultaneously viewed by a single eye and an analyzing polarizer in each of said aperture means capable of analyzing the polarized light rays transmitted by said target.

4. A visual testing apparatus for determining astigmatism and the like comprising an enclosure having open passages at each end, a diffused source of illumination adjacent one of said open passages delivering diffuse illumination thereto, a single fixation target having a central aperture in the form of a cross mounted in front of said open passage between said passage and the source of illumination, means for polarizing the light rays emitted by the source of illumination and transmitted by the aperture of the target to provide two different planes of polarized light whereby said target is differentially polarized, an eyepiece mounted at the other of the said open passages of said enclosure to be viewed by an eye being tested, said eyepiece being coaxial with the fixation target and the source of illumination and having aperture means spaced apart less than the diameter of the pupil of an eye so as to be simultaneously viewed by a single eye and an analyzing polarizer in each of said aperture means with the polarizing axis of said polarizer parallel to said different planes of polarized light from said target.

5. A visual testing apparatus for determining astigmatism and the like comprising an enclosure having open passages at each end, a source of illumination adjacent at least one of said open passages, a single fixation target having a central aperture in the form of a cross mounted in front of said open passage between said passage and the source of illumination, two polarizing plates mounted on said target with the axes at right angles to each other and having one edge of each in contact with each other on the medial line of the target aperture to provide two different planes of polarized light whereby said target is differentially polarized, an eyepiece mounted at the other of said open passages of said enclosure to be viewed by an eye being tested, said eyepiece being coaxial with the fixation target and the source of illumination and having aperture means spaced apart less than the diameter of the pupil of an eye so as to be simultaneously viewed by a single eye and an analyzing polarizer in each of said aperture means with the polarizing axis of said polarizer parallel to said different planes of polarized light from said target.

6. A visual testing apparatus as claimed in claim 5 wherein means are provided for synchronized rotation of the fixation target and the eyepiece.

7. A visual testing apparatus for determining astigmatism and the like comprising an enclosure having open passages at each end, a source of illumination adjacent at least one of said open passages, a single fixation target having a central aperture in the form of a cross mounted in front of said open passage between said passage and the source of illumination, two polarizing plates mounted on said target with the axes at right angles to each other and having one edge of each in contact with each other on the medial line of the target aperture to provide two different planes of polarized light whereby said target is differentially polarized, an eyepiece mounted at the other of said open passages of said enclosure to be viewed by a single eye being tested, said eyepiece being coaxial with the fixation target and the source of illumination, said eyepiece comprising a lens, a disc having two central minute apertures adjacent to each other, a polarizing plate in each of said central apertures with their polarizing axes at right angles to each other and in the same plane as the polarizing plates at the fixation target and means for synchronously rotating said fixation target and eyepiece.

8. A visual testing apparatus as claimed in claim 7 having gear means for synchronous rotation of the target and disc.

9. A visual testing apparatus as claimed in claim 7 wherein refractive means are provided for maintaining at rest the accommodative reflex of the eye under examination.

References Cited in the file of this patent

UNITED STATES PATENTS

| | | |
|---|---|---|
| 534,375 | Price | Feb. 19, 1895 |
| 1,680,663 | Campbell | Aug. 14, 1928 |
| 2,171,627 | Hartinger | Sept. 5, 1939 |
| 2,280,297 | Neumueller et al. | Apr. 21, 1942 |
| 2,670,654 | Norman | Mar. 2, 1954 |
| 2,748,764 | Boyd et al. | June 5, 1956 |

OTHER REFERENCES

The Optician, July 1947, pages 504–506, photocopy in 88/20(T) British.